United States Patent Office 3,538,226
Patented Nov. 3, 1970

3,538,226
METHOD OF DESTROYING PLANT FUNGI
Toshiaki Ozaki and Sigeo Yamamoto, Toyonaka-shi, Toshiyuki Wakatsuki, Kyoto, Akira Fujinami and Fukashi Horiuchi, Takarazuka-shi, and Yoshihiko Nishizawa, Nara-shi, Japan, assignors to Sumitomo Chemical Company, Ltd., Osaka, Japan, a corporation of Japan
No Drawing. Filed Sept. 18, 1967, Ser. No. 668,691
Claims priority, application Japan, Sept. 22, 1966, 41/62,770
Int. Cl. A01n 9/20
U.S. Cl. 424—304                                                     11 Claims

ABSTRACT OF THE DISCLOSURE

A fungicidal composition comprising as an active ingredient a fungicidally effective amount of a compound of the formula:

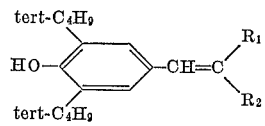

wherein $R_1$ is hydrogen atom, cyano or a group represented by —$COOR_3$ or —$COR_4$; and $R_2$ is cyano, nitro or a group represented by —$COOR_3$ or —$COR_4$, where $R_3$ is hydrogen atom or a lower alkyl; and $R_4$ is a lower alkyl group and an inert carrier. This composition is useful for preventing agricultural plant diseases, in particular rice blight.

This invention relates to a novel fungicidal composition. More particularly, the invention pertains to a fungicidal composition containing a certain phenol derivative as an active ingredient.

Rice crop is one of the most important agricultural products, and the damage of the rice crop due to injurious diseases and insects is a question of great significance. However, some of such injurious diseases cannot be effectively prevented by application of agricultural chemicals available at present. Moreover, the chemicals available at present suffer from such drawbacks that they are high in toxicity to human and cattle to bring about a great danger in the handling thereof, and give detrimental effect to crops. As the conventional agricultural fungicides, there have been used compounds containing elements which are extremely toxic to the human body, like the organo-mercury type fungicides. This is a serious question not only for those engaging in agriculture but also for the general consumers. In view of such actual situation as mentioned above, there has been desired the advent of fungicides which contain no toxic elements, have strong fungicidal activities and are less in toxicity to men and cattle as well as in detrimental effects on crops.

The present invention provides excellent fungicides capable of satisfying the above desire. The present inventors made repeated studies, aiming to obtain fungicides which are not only excellent in fungicidal effect but also are usable without any fear. As the result, the inventors have attained the present invention.

It is therefore the object of the present invention to provide agricultural fungicide compositions which are harmless to men and cattle and are usable without any fear.

The above-mentioned object can be achieved, in accordance with the present invention, by fungicidal compositions characterized by containing as active ingredient at least one compound represented by the general formula

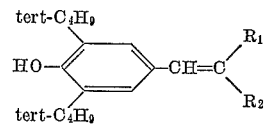

wherein $R_1$ is a hydrogen atom, a cyano group or a group represented by —$COOR_3$ or —$COR_4$; and $R_2$ is a cyano group, a nitro group or a group represented by —$COOR_3$ or —$COR_4$, when $R_3$ is a hydrogen atom or a lower alkyl group; and $R_4$ is a lower alkyl group.

The compounds represented by the above general formula are stable and can protect crops from pathogenic fungi for a long period of time without giving any detrimental effect to the crops. Thus, the excellent fungicidal effects and the stability of the present compounds are useful and valuable characteristics as agricultural fungicides. It is the present inventors that have first found such characteristics.

The present compounds have both preventive and curative effects on rice blight, in particular. Even when applied independently, therefore, the present compounds make it possible to sufficiently achieve the object of application, regardless of time and mode of application. However, the present compounds are particularly excellent in preventive effect and therefore when, utilizing said characteristic, the present compounds are used in admixture with such antibiotic as Blastocidin S or Kasugamycin, which is strong in curative effect, or with O,O-diethyl-S-benzylphosphorothioate or O - ethyl - S - benzylphenylphosphonothiolate, which is strong in curative effect as well, at least the additive effect of prevention and cure is attained, and rice blight can be prevented and exterminated more accurately than in the case where each chemical is used independently. In order to minimize labours in prevention and extermination of injurious diseases and insects and to attain the simultaneous prevention and extermination of rice blight and rice sheath blight or the simultaneous fungicidal and insecticidal effect on rice blight and two-brooded rice borers, there is sometimes used a mixed formulation comprising an organo-arsenic compound, which is effective towards rice sheath blight, and an organo-mercury compound, which is effective towards rice blight, or a mixed formulation comprising an organo-mercury compound or antibiotic and an organo-phosphorus insectide. In the case of these mixed formulations, however, chemical reactions take place between the active ingredients to form less effective components, and therefore there are frequently observed the cases where the effects of such mixed formulations are inferior to those of the individual constituents.

In the case of the present compounds, no such drawbacks are brought about even when they are mixed, in order to be used for the above purpose, with O,O-dimethyl-O-(3-methyl-4-nitrophenyl)-phosphorothioate and the effects of the individual chemicals are not reduced. Further, the present compounds can be used in admixture with any of such fungicides as copper compounds, organo-mercury compounds, organo-arsenic compounds and organo-sulfur compounds, or with any of such antibiotics as Blastocidin S, Kasugamycin, Streptomycin, chloramphenicol and cellocidin. In addition thereto, the present compounds can be used, for the purpose of simultaneous prevention and extermination of 2 or more kinds of injurious insects, in admixture with any of carbamate-type insecticides and such insecticides as BHC, parathion, Malathion, O,O-dimethyl-O-(3-methyl-4-nitrophenyl) phosphorothioate, EPN and Dimethoate. The present compounds can further be used in admixture with any of the aforesaid fungicides. In any cases, however, the preventive and exterminative effects of the individual chemicals are not reduced. It would therefore be naturally thought of for those skilled in the art that by the combinations of chemicals, synergistic effects due to mixing may be expected.

Useful compounds for the object of the present invention are as shown below, but the compounds of the present invention are, of course, not limited only to these.

(1) 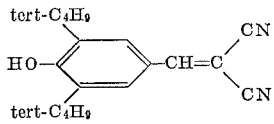

(2) 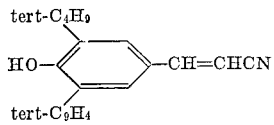

(2) 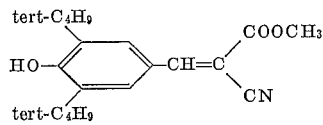

(4) 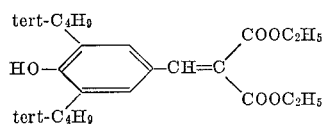

(5) 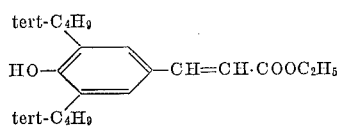

(6) 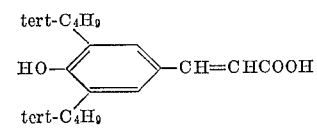

(7) 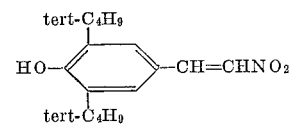

(8) 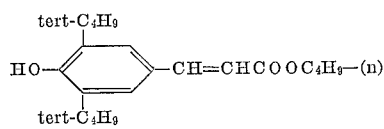

(9) 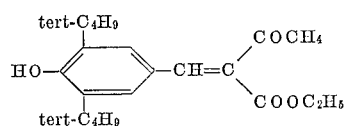

(10) 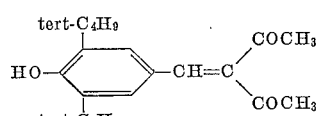

The compounds of the present invention can be easily prepared by treating 3,5-di-tert-butyl-4-hydroxybenzaldehyde with compounds represented by the general formula

wherein $R_1$ and $R_2$ are as defined before, followed by dehydration and condensation.

In actual application, the present compounds may be used in a pure form without incorporation of other components. However, in order to make easier the use of the present compounds as agricultural fungicides, they may be formulated into any forms ordinarily adopted for agricultural and horticultural fungicides, such as for example, dusts, wettable powders, emulsifiable concentrates and granular preparations.

In formulating the present compounds into the above forms, not only agricultural spreaders may be incorporated to enhance and secure the effects of the present compounds but also other fungicides, insecticides, herbicides and the like agricultural chemicals or fertilizers may be used in admixture, as has already been mentioned.

The preparation of the present compositions as fungicides will be illustrated further in detail below with reference to examples. It is however, needless to say that the kinds and mixing proportions of compounds and additives are not limited to only those shown in the examples but are variable to a wide scope. The names of the compounds employed are represented by the numbers of the compounds exemplified previously.

EXAMPLE 1

65 parts of the compound (2), 5 parts of a wetting vehicle (polyoxyethylene alkylphenol ether type) and 30 parts of Kaolin are mixed together to obtain a wettable powder having a main ingredient content of 65%. In application, the powder is diluted with water and is then sprayed.

EXAMPLE 2

50 parts of the compound (10), 5 parts of a wetting vehicle (alkylbenzenesulfonate type) and 45 parts of diatomaceous earth are thoroughly crushed and mixed together to obtain a wettable powder having a main ingredient content of 50%. In application, the powder is diluted with water and is then sprayed.

EXAMPLE 3

3 parts of the compound (8) and 97 parts of clay are thoroughly pulverized and mixed together to obtain a dust having a main ingredient content of 3%. In application, the dust is dusted as such.

EXAMPLE 4

2 parts of the compound (7), 2 parts of O,O-diethyl-S-benzylphosphorothioate and 96 parts of talc are thoroughly pulverized and mixed together to obtain a mixed dust. In application, the mixed dust is dusted as such.

EXAMPLE 5

2 parts of the compound (6), 2 parts of Sumithion S and 97.8 parts of talc are thoroughly pulverized and mixed together to obtain a mixed dust. In application, the mixed dust is dusted as such.

EXAMPLE 6

2 parts of the compound (6), 2 parts of Sumithion and 96 parts of talc are thoroughly pulverized and mixed together to obtain a mixed dust. In application, the mixed dust is dusted as such.

EXAMPLE 7

2 parts of the compound (4), 2 parts of 3,4-dimethylphenyl-N-methylcarbamate and 96 parts of clay are thoroughly pulverized and mixed together to obtain a mixed dust. In application, the mixed dust is dusted as such.

EXAMPLE 8

2 parts of the compound (1), 2 parts of Sumithion, 0.2 part of Blastocidin S, 0.4 part of iron methylarsonate and 95.4 parts of clay are thoroughly pulverized and mixed together to obtain a mixed dust. In application, the mixed dust is dusted as such.

Typical test results concerning the effects of the present fungicides will be shown below.

Test Example 1.—Flower pot test

To rice plants cultivated to a 3-leaved stage in flower pots of about 3 inches in diameter, individual chemicals at a given concentration were sprayed in a proportion of 7 ml. per pot. One day after the spray, the rice plants were inoculated with a cultured liquid of spores of *Piricularia oryzae* Cavara. Thereafter, the fungicidal effects of the test chemicals were examined to obtain the results as shown in Table 1. In the table, the preventive value represents a numerical value calculated according to the equation:

Preventive value =

$$\frac{[\text{Number of spots in non-treated area}] - [\text{Number of spots in treated area}]}{\text{Number of spots in non-treated areas}} \times 100$$

No phytotoxicity was observed in every chemical.

TABLE 1

| Compound: | Concentration, (p.p.m.) | Affected leaves percent | Preventive value percent |
|---|---|---|---|
| (1) | 100 | 0.0 | 100.0 |
| (2) | 100 | 0.0 | 100.0 |
| (3) | 100 | 0.0 | 100.0 |
| (4) | 100 | 5.4 | 92.7 |
| (5) | 100 | 8.7 | 86.3 |
| (6) | 100 | 8.1 | 84.1 |
| (7) | 100 | 2.5 | 96.4 |
| (8) | 100 | 7.6 | 89.2 |
| (9) | 100 | 7.4 | 89.0 |
| (10) | 100 | 8.5 | 85.7 |
| Phenylmercuric acetate | 30 | 10.3 | 83.5 |
| Non-treatment | | 100.0 | 0.0 |

Test Example 2.—Effectiveness test on rice blight

Preventive test.—A rice nursery of 1 m.² per section was prepared. When the rice plants had reached a 3–4 leaved stage, individual test dusts were dusted onto the rice plants in a proportion of 3 kg. per 10 ares. One day after, the rice plants were inoculated with a liquid of spores of *Piricularia oryzae* Cavara. Thereafter, the number of spots generated gas counted to calculate preventive values according to the same equation as in Test Example 1. The results were as shown in Table 2.

Curative effect.—Likewise, a rice nursery of 1 m.² per section was prepared. When the rice plants had reached a 3–4 leaved stage, the rice plants were inoculated with a liquid of spores of *Piricularia oryzae* Cavara. One day after, individual test dusts were sprayed onto the rice plants in a proportion of 3 kg. per 10 ares. Thereafter, the number of spots generated was counted to calcuate curative values according to the same equation as in the case of the preventive values. The results were as shown in Table 2.

TABLE 2

| Chemical | Concentration of active ingredient percent | Preventive value | Curative value |
|---|---|---|---|
| Compound (7) dust | 2.0 | 91.3 | 86.5 |
| Compound (3) dust | 2.0 | 94.2 | 88.4 |
| Compound (1) dust | 2.0 | 95.6 | 87.1 |
| O,O-diethyl-S-benzyl-phosphorothioate dust | 2.0 | 82.7 | 88.0 |
| Blastocidin S dust | 0.2 | 59.6 | 93.3 |
| Mixed dust: | | | |
|   Compound (7) | 2.0 } | 99.6 | 99.4 |
|   O,O-diethyl-S-benzyl-phosphoro-thioate | 2.0 | | |
| Mixed dust: | | | |
|   Compound (3) | 2.0 } | 100.0 | 100.0 |
|   Blastocidin S | 0.2 | | |
| Mixed dust: | | | |
|   Compound (1) | 2.0 } | 100.0 | 99.8 |
|   Blastocidin S | 0.2 | | |
|   Sumithion | 2.0 | | |
|   Iron methylarsonate | 0.4 | | |
| Non-treatment | | 0.0 | 0.0 |

Test Example 3.—Effectiveness test on two-brooded rice borers

To an aquatic rice field of 0.5 are per sectional area, 3 kg./10 ares of individual test dusts were dusted by means of a midget duster after 10 days from the time when the growth of two-brooded rice borers had been most virgorous. After 5 days, 50 rice plants per section were investigated. The results were as shown in Table 3.

TABLE 3

| Chemical | Concentration of active ingredient percent | Ratio of affected stems percent |
|---|---|---|
| Sumithion dust | 2.0 | 9.5 |
| Mixed dust: | | |
|   Compound (6) | 2.0 } | 9.1 |
|   Sumithion | 2.0 | |
| Mixed dust: | | |
|   Compound (1) | 2.0 } | 9.5 |
|   Sumithion | 2.0 | |
|   Blastocidin S | 0.2 | |
|   Iron methylarsonate | 0.4 | |
| Non-treatment | | 61.5 |

Test Example 4.—Effectiveness test on green rice leaf hoppers

The habitat density of green rice leaf hoppers in an aquatic rice field of 1 are per sectional area was measured according to dip up method. Thereafter, individual test dusts were dusted to the rice field in a proportion of 3 kg. per 10 ares. One day after, the number of survival leaf hoppers in each section was measured to obtain the results as shown in Table 4.

TABLE 4

| Chemical | Concentration of active ingredient percent | Index of living leaf hopper: Before dusting | Index of living leaf hopper: After dusting |
|---|---|---|---|
| 3,4-dimethylphenyl-N-methylcarbamate dust | 2.0 | 105 | 1.5 |
| Mixed dust: | | | |
|   Compound (4) | 2.0 } | 106 | 1.1 |
|   3,4-Dimethyl-phenyl-N-methylcarbamate | 2.0 | | |
| Non-treatment | | 100 | 100 |

Tests Example 5.—Effectiveness test on rice sheath blight

To aquatic rice plants in a paddy field where rice sheath blight had broken out, individual test dusts were dusted by means of a manual duster in a proportion of 3 kg. per 10 ares. Thereafter, the disease ratio of rice plants was examined. The results were as shown in Table 5.

TABLE 5

| Chemical | Concentration of active ingredient (percent) | Disease ratio (percent) | |
|---|---|---|---|
| | | Before dusting | After dusting |
| Iron methylarsonate dust | 0.4 | 12.5 | 15.4 |
| Mixed dust: | | | |
| Compound (1) | 2.0 | 13.1 | 15.0 |
| Iron methylarsonate | 0.4 | | |
| Sumithion | 2.0 | | |
| Blastocidin S | 0.2 | | |
| Non-treatment | | 13.1 | 64.2 |

What is claimed is:

1. A method of destroying plant fungi comprising applying to said fungi a fungicidally effective amount of a compound having the formula 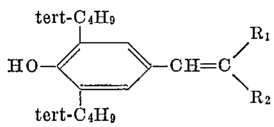 wherein $R_1$ is hydrogen, cyano, —$COOR_3$ or —$COR_4$; and $R_2$ is cyano, nitro, —$COOR_3$ or —$COR_4$, where $R_3$ is hydrogen or lower alkyl; and $R_4$ is lower alkyl.

2. A method of destroying plant fungi comprising applying to said fungi a fungicidally effective amount of a compound having the formula 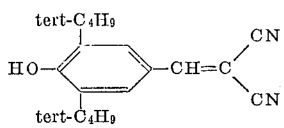 3. A method of destroying plant fungi comprising applying to said fungi a fungicidally effective amount of a compound having the formula 4. A method of destroying plant fungi comprising applying to said fungi a fungicidally effective amount of a compound having the formula 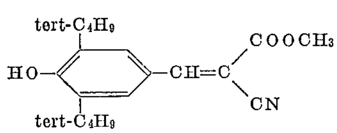 5. A method of destroying plant fungi comprising applying to said fungi a fungicidally effective amount of a compound having the formula 6. A method of destroying plant fungi comprising applying to said fungi a fungicidally effective amount of a compound having the formula 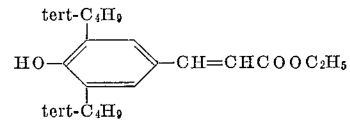 7. A method of destroying palnt fungi comprising applying to said fungi a fungicidally effective amount of a compound having the formula 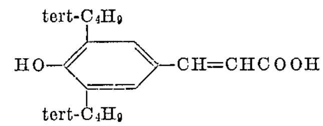 8. A method of destroying plant fungi comprising applying to said fungi a fungicidally effective amount of a compound having the formula 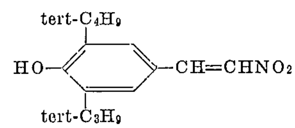 9. A method of destroying plant fungi comprising applying to said fungi a fungicidally effective amount of a compound having the formula 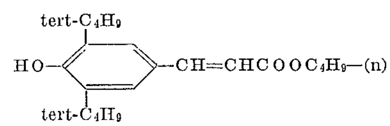 10. A method of destroying plant fungi comprising applying to said fungi a fungicidally effective amount of a compound having the formula 11. A method of destroying plant fungi comprising applying to said fungi a fungicidally effective amount of a compound having the formula

References Cited

UNITED STATES PATENTS 3,244,668 4/1966 Knapp et al.
3,280,069 10/1966 Knapp et al.

OTHER REFERENCES

Muller et al. Justus Liebigs Annalen Der Chemie, volume 645, pp. 53–65 (1961).

JEROME D. GOLDBERG, Primary Examiner

U.S. Cl. X.R.

424—308, 417, 331, 346